United States Patent
Camand et al.

(10) Patent No.: US 8,423,686 B2
(45) Date of Patent: Apr. 16, 2013

(54) METHOD AND DEVICE FOR DETECTING ERRONEOUS TRANSFERS FOR MICROCONTROLLER OR MICROPROCESSOR WITH A VIEW TO GUARANTEEING PARTITIONING

(75) Inventors: Sébastien Camand, La Garenne Colombes (FR); Tarik Aegerter, Seine Port (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 12/974,180

(22) Filed: Dec. 21, 2010

(65) Prior Publication Data
US 2011/0153873 A1 Jun. 23, 2011

(30) Foreign Application Priority Data
Dec. 23, 2009 (FR) .................................. 09 06263

(51) Int. Cl.
*G06F 3/00* (2006.01)
(52) U.S. Cl.
USPC ............................................. 710/15; 714/53
(58) Field of Classification Search .................... 710/15; 714/53
See application file for complete search history.

(56) References Cited

U.S. PATENT DOCUMENTS

| | | | | |
|---|---|---|---|---|
| 6,009,542 A * | 12/1999 | Koller et al. | | 714/53 |
| 6,094,732 A * | 7/2000 | Takano | | 714/53 |
| 7,418,636 B2 * | 8/2008 | Driediger | | 714/53 |
| 7,685,342 B2 * | 3/2010 | Shiraki et al. | | 710/74 |
| 7,886,205 B2 * | 2/2011 | Lang et al. | | 714/718 |
| 2003/0028701 A1 * | 2/2003 | Rao et al. | | 710/305 |
| 2007/0169172 A1 * | 7/2007 | Backes et al. | | 726/2 |
| 2008/0320342 A1 * | 12/2008 | Imagawa et al. | | 714/53 |
| 2010/0005244 A1 * | 1/2010 | Weiberle et al. | | 711/130 |

* cited by examiner

*Primary Examiner* — Elias Mamo
(74) *Attorney, Agent, or Firm* — Baker Hostetler LLP

(57) ABSTRACT

A method and a device for the detection of erroneous or inopportune transactions of any entity of a microprocessor or microcontroller includes programming counters internal or external to the microcontroller, which is configured to count the number of transactions in the target area of the target interface of the microcontroller; count the total number of transactions on the target interface, and verify that the number of transactions outside of the target area of the target interface of the microcontroller is zero. Equality between the number of transactions in the target area of the target interface and the total number of transactions on the target interface of the microcontroller is verified.

20 Claims, 5 Drawing Sheets

METHOD AND DEVICE FOR DETECTING ERRONEOUS TRANSFERS FOR MICROCONTROLLER OR MICROPROCESSOR WITH A VIEW TO GUARANTEEING PARTITIONING

CROSS-REFERENCE TO RELATED APPLICATION

This application claims priority to foreign French patent application No. FR 09 06263, filed on Dec. 23, 2009, the disclosure of which is incorporated by reference in its entirety.

FIELD OF THE INVENTION

The present invention relates to the general field of embedded computers comprising processors or microcontrollers equipped with direct memory access units. The invention provides a solution to the problem related to the risks of erroneous or inopportune transactions by way of these direct memory access units or by way of external master peripherals connected to the processor. The invention also makes it possible to compensate for a malfunction of the unit for monitoring processor accesses or else to offset its absence.

BACKGROUND OF THE INVENTION

A common difficulty, notably in the aeronautical sector, when an embedded computer is fine-tuned, resides in the question of certification. Conventionally, a computer comprises at least one processor, corresponding to a computation unit, and peripherals, such as electronic cards ensuring a plurality of functions. In this case, the process for certifying the processor on the one hand, and the peripherals on the other hand, is well mastered by the person skilled in the art. In general, the processors, simple computation units, are COTS (Components Off The Shelf), that is to say they are chosen by catalogue, and associated with management peripherals.

These peripherals, developed to ensure specific functions, are certified separately by the manufacturer of the computer or with a view to being integrated into a particular computer. However, today's embedded computers include ever more microcontrollers comprising at one and the same time—in the same physical chip—one or more processors and its peripherals such as the interfaces with the random access memory, which is external to the microcontroller, or PCI input-output interfaces for example.

This makes certification trickier since the microcontrollers exhibit limited observability of the transactions which take place therein.

The general problem which ensues therefrom is therefore concerned with the partitioning of the tasks within a microcontroller. Satisfactory partitioning must be guaranteed so as ensure the security of the transactions in the microcontroller.

In the aeronautics sector, current developments are carried out with the goal of increasing the share of integrated modular avionics, known by the acronym IMA. The general principle of this integrated modular avionics logic consists in creating, for the peripherals of microcontrollers, the illusion of multiple resources in terms of computation units, that is to say of processors, and of memory. Whence the principle of partitioning, which consists in contriving matters such that a problem on one resource must not impact the other resources. International standards, in particular the DO-178B standard for software and the DO-254 standard for hardware, govern the security level to be achieved, notably for computers embedded aboard aircraft.

Dealing as one is with platforms of IMA type, the notion of partitioning is the keystone of the architecture. For platforms that are intended to host functions with high criticality—corresponding for example to the DAL, the acronym standing for Design Assurance Level, level "A" according to standard DO178 or DO254—, the manufacturer of the computer must be capable of demonstrating the robustness of this partitioning.

In this context, a mechanism for verifying the memory accesses performed by the controller integrated into the processors intended to form part of embedded computers is known from the state of the art. This type of mechanism bears the acronym MMU standing for Memory Management Unit. Its role, as its name indicates, is to check memory accesses. Early processors did not comprise this type of mechanism which could be a separate element. Today, most processors comprise MMUs; these make it possible to check memory accesses for all the transactions passing through the processor and therefore to guarantee largely this notion of partitioning. The problem for current microcontrollers is that this MMU verification mechanism is short-circuited when transactions pass through an external master peripheral or through a direct memory access unit, known to the person skilled in the art by the acronym DMA for Direct memory access. The DMAs are placed after the MMUs of the processors. Thus, in the case of a malfunction, there may be rupture of the partitioning of the resources of the microcontroller, which, as has been seen, may turn out to be critical. The problem also resides in the guaranteeing of partitioning on processors not comprising any MMU. Today, it seems impossible to the person skilled in the art to achieve certification of an embedded computer in which some functions of a microcontroller utilize direct memory access units (DMA), and/or in which external master peripherals perform transfers competing with code execution by the microcontroller and/or in which the processor does not possess any MMU. According to the earlier state of the art, this problem was solvable for these computers comprising on the one hand one or more processor(s) in separate component form, and on the other hand specially adapted peripherals. Indeed, it was possible to develop a peripheral of controller type, comprising peripherals, communication means, memory accesses . . . etc. and a specially developed component to check the memory accesses and accesses to the input-output interfaces. In this way, the data buses between the processor and the controller were observable, and the said specially developed controller was able to obtain the proper certification.

Conversely, the basic element of today's embedded computers is no longer a processor, but a microcontroller, comprising at one and the same time the processor, optionally multi-core, and a certain number of peripherals, with the controllers of memory access and the controllers of access to inputs-outputs of PCI or PCI Express type for example within the same physical component. The data buses integrated into the design of the microcontrollers are not readily observable.

In this case, where microcontrollers are used with a view to integrating them into embedded computers, the solution known to the person skilled in the art for circumventing this problem consists in not performing any transaction passing through a DMA or through an external master peripheral; therefore, all the transactions are subject to passage through the processor and to a controller by the MMU type memory access verification mechanism. The drawback of this solution is obviously that it precludes the use of DMAs, which nevertheless exhibit, notably, the significant advantage of allowing data exchanges to be carried out very rapidly.

The technical problem posed is therefore that of the possibility of guaranteeing the detectability of erroneous accesses, carried out via direct memory access units or via external master peripherals, for the purposes of guaranteeing the partitioning of the functions within a microcontroller.

SUMMARY OF THE INVENTION

The invention solves the abovementioned problems by the programming of counters internal to the microcontroller or, optionally, external, to verify that the transactions passing through the direct memory access units or through the external master peripherals are licit.

The invention includes a method for detecting inopportune or erroneous transactions by way of a direct memory access unit or of an external master peripheral, for implementation on a microcontroller, the said microcontroller exhibiting a direct memory access unit and at least one interface linked to the said direct memory access and the said microcontroller being able to implement transactions by way of the direct memory access unit or of the external master peripheral connected to the microprocessor or microcontroller, from and to a target area of a target interface of the microcontroller, the said target interface possibly being a private area of an application package on a memory external to the microcontroller, the said microcontroller moreover comprising at least one non-target interface, to which no transaction can be performed, the said method comprising a step of verifying the number of transactions on the said non-target interface, the said number of transactions on the said non-target interface having to be zero.

In an embodiment, the method according to the invention includes the following steps:
   the programming of a set of counters internal or external to the microcontroller, the counters being configured to:
      count the number of transactions in the target area of the target interface of the microcontroller;
      count the total number of transactions on the said target interface;
      verify that the number of transactions outside of the target area of the target interface of the microcontroller is zero.
   the verification of equality between the number of transactions in the target area of the target interface and the total number of transactions on the target interface of the microcontroller.

The target area can correspond to a range of addresses of the target interface.

Advantageously, the method according to the invention may be implemented by the following steps:
   the programming of one or more performance counter(s), that may be associated with a memory controller internal to the microcontroller, to count the total number of transactions to all the interfaces, including the target interface;
   the programming of a logic pseudo-analyser to count the total number of transactions in the private area of the application package in progress;
   the comparison of the total number computed by the logic pseudo-analyser with the total number computed by the performance counter of the target interface, to verify their equality;
   the programming of a set of performance counters to verify that the number of transactions on the non-target interfaces is zero.

According to one embodiment, the microcontroller including at least one critical interface in which any write-transaction is prohibited, the step aimed at verifying that the number of transactions outside of the target area of the target interface of the microcontroller is zero consists in verifying that the number of write-transactions on the critical interface is zero.

The invention also provides a device for detecting inopportune or erroneous transactions by way of a direct memory access unit or of an external master peripheral for use in a microcontroller, the said microcontroller comprising at least one microprocessor, a direct memory access unit, and one or more interfaces corresponding to one or more external memory unit(s) and/or to one or more input-output interface (s), the microcontroller moreover being able to implement transactions by way of the direct memory access unit, to a target area of a target interface of the microcontroller, moreover comprising a plurality of counters internal and/or external to the microcontroller, which are programmed so as to supervise the transactions between the direct memory access unit and the said target interface.

Advantageously, the device according to the invention ensures the function of memory management unit of the processor integrated into the microcontroller.

Advantageously, the device according to the invention includes at least three counters, configured respectively to:
   count the number of transactions in the target area of the target interface of the microcontroller;
   count the total number of transactions on the said target interface;
   verify that the number of transactions outside of the target area of the target interface of the microcontroller is zero.

According to one embodiment of the device according to the invention, the microcontroller comprising at least one microprocessor comprising a data and monitoring bus by way of which all the transactions within the microcontroller travel, a proportion at least of the counters is connected to the said data and monitoring bus.

According to one embodiment of the device according to the invention, the microcontroller comprising a clock, a proportion at least of the counters is regulated by the said clock of the microcontroller.

According to another embodiment of the device according to the invention, in which the microcontroller comprises a clock, a proportion at least of the counters are performance counters metering the number of transactions culminating in success.

According to one embodiment, in which the microcontroller comprises deactivated interfaces, the device according to the invention comprises a counter configured to verify that the number of transactions on the said deactivated interfaces is zero.

The device according to the invention can include a plurality of interfaces.

The interfaces may be sub-sets of one and the same physical interface, such as various memory areas within one and the same random access memory unit.

The present invention also includes a microcontroller for embedded computer, including the previously-described device for detecting erroneous or inopportune transactions.

Advantageously, the microcontroller according to the invention includes one or more single-core or multi-core processors.

Additionally, an embedded computer according to the invention includes a microcontroller such as described herein.

BRIEF DESCRIPTION OF THE DRAWINGS

Other characteristics and advantages of the invention will become more readily apparent with the aid of the description which follows, offered with regard to the appended drawings, which represent.

DETAILED DESCRIPTION

Figure 1:
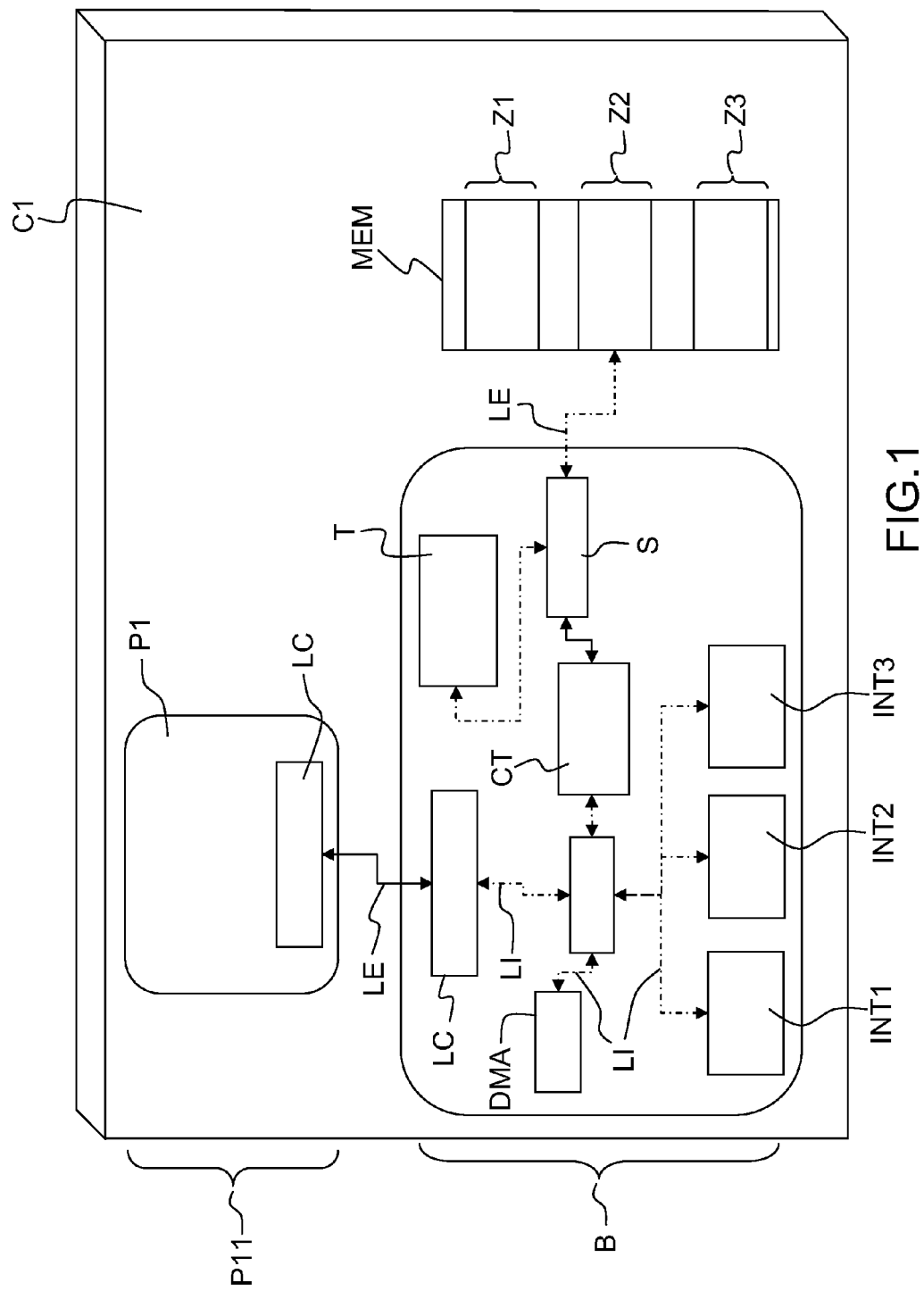
FIG. 1: the diagram of a computation module according to the earlier state of the art.

FIG. 1 presents a computation module C1 diagram. This computation module C1 comprises a processor P11, in accordance with the earlier state of the art, and having means for ensuring the actual processor function P1, and a communication bus LC. Via an external bus LE, the processor P11 is linked to the communication bus LC of a bridge B specifically designed to cooperate with the processor P11 and be implemented in the computation module C1. This corresponds to common practice, according to the earlier state of the art, developed by the manufacturers of embedded computers. The bridge B comprises internal buses LI and all the elements necessary for the management of the inputs/output in relation to a microprocessor P11 and interfaces, INT1, INT2, INT3 corresponding to various peripherals, such as PCI ports, external memory MEM . . . etc.

These necessary elements generally include an access supervisor S, linked to the external memory MEM by way of an external bus LE. The access supervisor S communicates with an access rights configuration table T, so as to verify that a program wishing to perform a transaction from and to a private area Z1, Z2, Z3 of an application package is indeed authorized therefor.

After they are checked by the access supervisor S, requests originating from the external memory MEM are analysed by a memory controller CT, charged with translating these requests and with "steering" them towards the appropriate interface INT1, INT2, INT3, MEM and with managing a stack of requests. Finally, an arbitrator A has the function of arbitrating among the stack of requests managed by the memory controller CT, those which consist of write-instructions and those which consist of read-requests. The arbitrator A thereafter distributes the requests to the appropriate interfaces INT1, INT2, INT3, MEM, optionally via a DMA direct memory access unit, such as described in the preamble, or via the processor P1.

As explained previously, the bridge B is specifically developed for a particular computation module C1. The inputs/outputs of this bridge B are observable. Moreover, the bridge B comprises elements, memory controller CT, arbitrator A, which allow a check of the requests and transactions performed between the external memory MEM and the various interfaces INT1, INT2, INT3, including when a transaction is performed by way of the DMA direct memory access unit.

Figure 2:
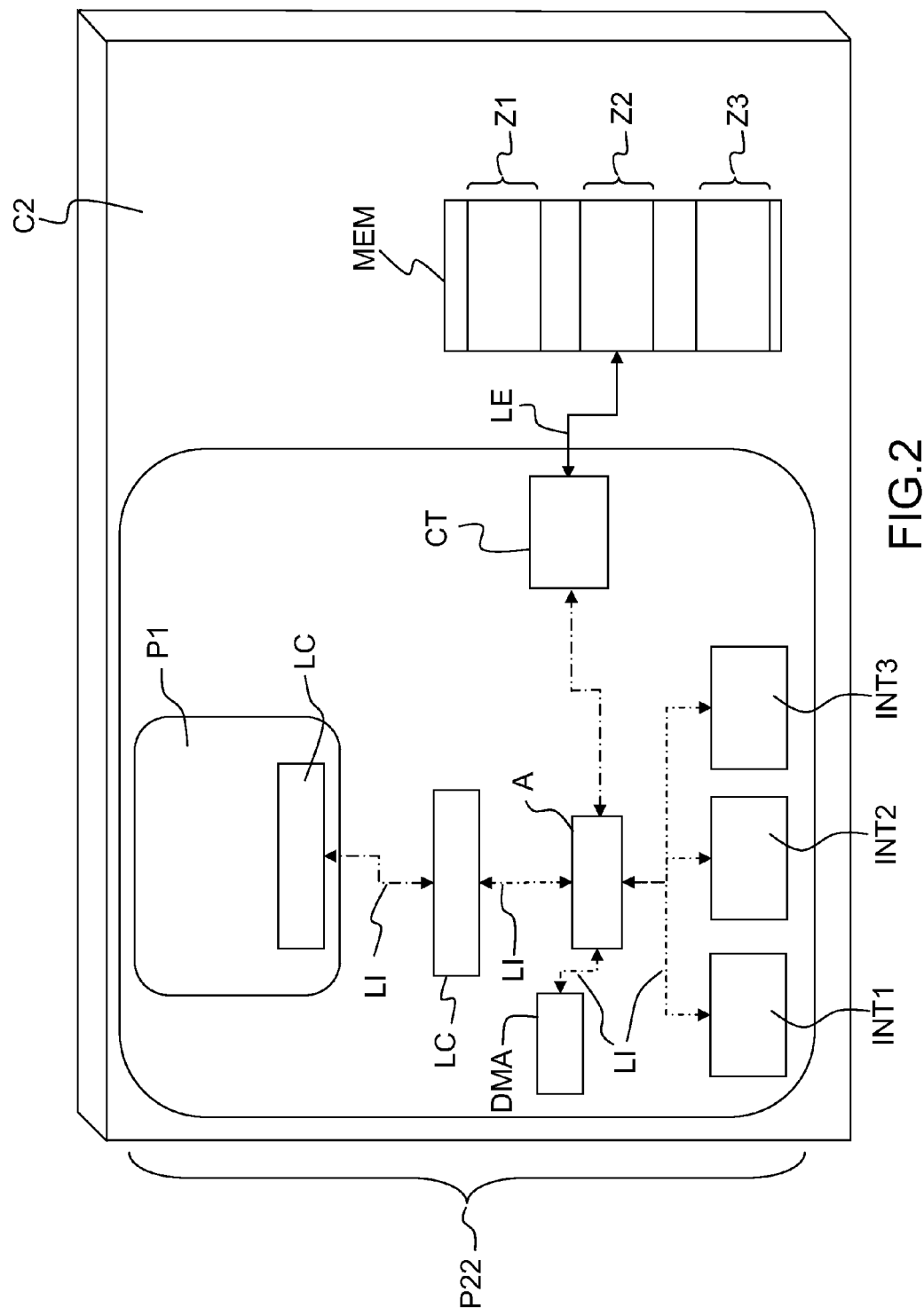
FIG. 2: the diagram of a recent microcontroller, called on to replace the microprocessors of the earlier state of the art.

Now, as shown by FIG. 2 through a diagram representative of the current state of the art, the most recent processors P22 integrate ever more functions, in terms of management of the interfaces INT1, INT2, INT3, memory checking CT, arbitration A, or management of a DMA direct memory access unit, which makes them genuine microcontrollers.

The current computation modules C2 based on these processors P22 no longer make it possible to employ specific solutions as the bridge B of FIG. 1.

The major drawback was mentioned above: in the case of a malfunction of the DMA direct memory access unit, there may be rupture of the partitioning of the resources of the microcontroller P22, and consequently, for example, an inopportune write to an interface INT1, INT2, INT3 or a private area Z1, Z2, Z3 of an application package.

Figure 3:
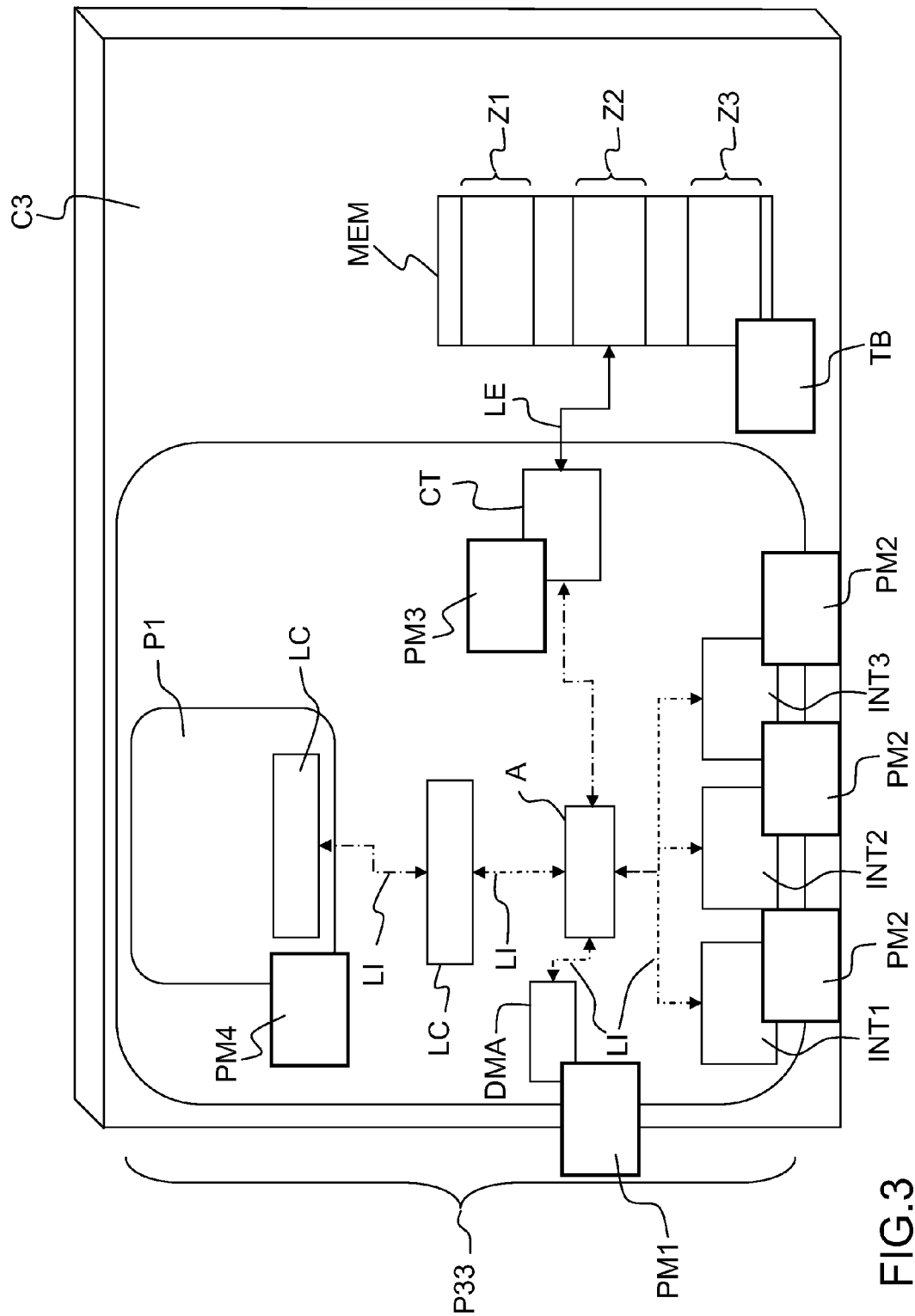
FIG. 3: the diagram of a computation module implementing the invention.

In order to check whether an inopportune transaction has occurred by way of the DMA direct memory access unit, the subject of the invention is a device represented schematically in FIG. 3.

The computation module C3 comprises a microcontroller P33 configured in accordance with the invention.

The principle of the invention consists in programming counters PM1, PM2, PM3, or "intelligent" counters, that is to say logic pseudo-analysers TB, known to the person skilled in the art by the term tracebuffer TB. The presence of these counters PM1, PM2, PM3 and of these tracebuffers TB must allow the users to measure more precisely the performance of the programs executed on the computation module C3. The counters PM1 . . . etc. and logic pseudo-analysers TB may equally well be internal as external to the microcontroller P33. The counters PM1 . . . etc. represented in FIG. 3 may be regulated by a clock internal to the microcontroller; they may also constitute performance counters, known by the term performance monitor, able to count the number of transactions culminating in success. The monitoring conducted by these counters PM1 . . . etc. or these tracebuffers TB is intended to cover the various exchanges of data, so as to ensure that each transfer of data using the DMA direct memory access unit is indeed performed in the envisaged target area of the target interface INT1, INT2, INT3 or of the external memory MEM. The expression target area is understood to mean the area to which access is envisaged; this target area can be situated on an interface INT1, INT2, INT3, corresponding for example to a PCI card, or be a range of addresses which is situated in a private area Z1, Z2, Z3 of the external memory MEM associated with an application package.

In the subsequent description, the term 'counter' can equally well refer to a simple counter as to a performance counter.

The manner of operation of the method according to the invention exhibits two typical cases. When the DMA direct memory access unit is inactive, the objective of the monitoring of the DMA direct memory access unit is to verify that the latter is not activated in an inopportune manner, that is to say in an undesired manner. The invention then provides for the programming of a counter PM1 associated with the DMA direct memory access unit so as to verify that the direct memory access unit is not triggered in an inopportune manner: this counter PM1 must therefore normally return a zero value. Alternatively, it is possible to program counters PM2 associated with the various interfaces INT1, INT2, INT3. These counters must return a zero value if no transaction is provided on these interfaces.

When the DMA direct memory access unit is active, the objective of the monitoring is to ensure that the DMA direct memory access unit performs transactions only in the target areas envisaged, and with the expected number of transactions. In this case the method according to the invention includes several functions:

the programming of a set of counters PM1, PM2, PM3 internal or external to the microcontroller P33, the said counters PM1, PM2, PM3 being configured to:
 count the number of transactions in the target area of the target interface INT1, INT2, INT3, MEM of the microcontroller P33;
 count the total number of transactions on the said target interface INT1, INT2, INT3, MEM;
 verify that the number of transactions outside of the target area of the target interface INT1, INT2, INT3, MEM of the microcontroller P33 is zero.
the verification of equality between the number of transactions in the target area of the target interface INT1, INT2, INT3, MEM and the total number of transactions on the target interface INT1, INT2, INT3, MEM of the microcontroller P33.

The method may be implemented in the following manner:
the programming of one or more performance counter(s) PM3, that may be associated with a memory controller CT, to count the transactions to all the interfaces INT1, INT2, INT3, MEM, including that intended to be the recipient of the transaction, for example INT1;
the programming of a logic pseudo-analyser TB (trace-buffer) to count all the transfers in the private area Z1, Z2, or Z3 of the application package in progress; this private area Z1, Z2, or Z3 is a memory area that may be located either in external memory MEM, or in any mapped input/output area;
the comparison of the counting carried out by the logic pseudo-analyser TB with the counting carried out by the performance counter PM2 of the recipient interface, for example INT1, so as to verify equality;
the verification that the other counters PM2 on the non-recipient interfaces, for example INT2, INT3, have a zero value, or their value before the transfer if they are not reset to zero.

The method may also be implemented in the following manner:
the programming of a logic pseudo-analyser TB (trace-buffer) to count all the transfers in the areas external to the target area; this therefore guarantees the partitioning of the system using the target area.

Moreover, current microcontrollers also generally comprise a performance counter PM4 at the level of the processor P1, but the latter is not used to implement the method according to the invention.

It should be noted that in addition to the method, the subject of the invention is also a device comprising the counters, and/or performance counters PM1, PM2, PM3, and logic pseudo-analyser TB that are able to allow the implementation of the previously described method, by way of suitable programming.

The present invention also covers a microcontroller comprising such a device, as well as a computation module or computer equipped with such a microcontroller.

The present invention also relates to the processors comprising such a device but not possessing any MMU.

An implementation of the invention may be envisaged on a microcontroller comprising a data and monitoring bus by way of which all the transactions within the microcontroller travel; in this case, it may be configured in such a way that a proportion at least of the counters PM1, PM2, PM3 is connected to the said data and monitoring bus.

Figure 4A:
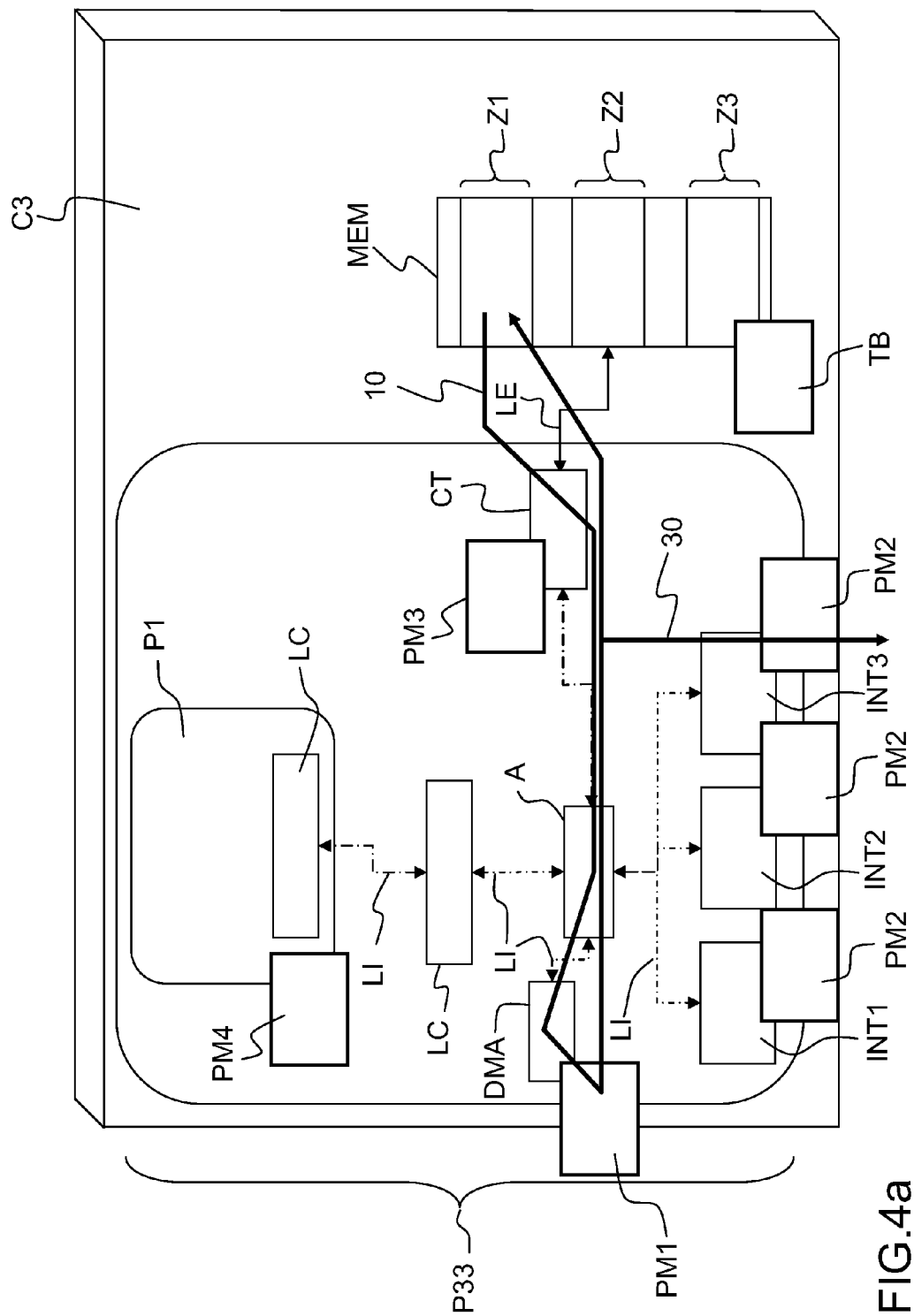
FIG. 4a: the diagram of a first exemplary application of the invention.
Figure 4B:
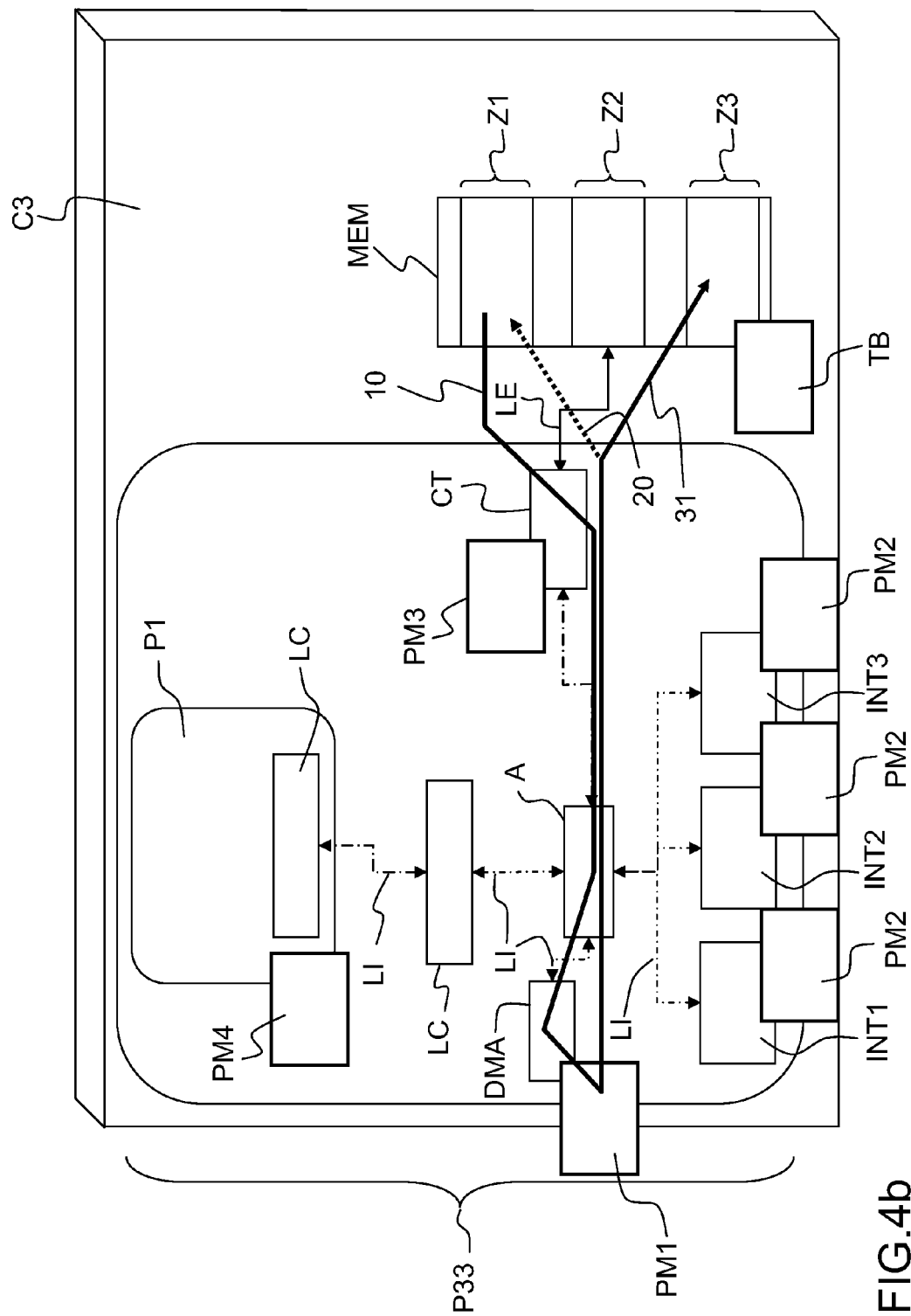
FIG. 4b: the diagram of a second exemplary application of the invention.

FIGS. 4a and 4b represent examples of malfunctions of the DMA direct memory access unit that the method according to the invention makes it possible to detect.

In the case of FIG. 4a, a request 10 with a view to a data transaction is issued from the private area Z1 of an application package in the external memory MEM. This request processed via the DMA direct memory access unit must return 20 to the said private area Z1. However, a malfunction of the DMA direct memory access unit gives rise to a duplication of the transfer, and in addition to an access to the private area Z1, an access to the interface INT3 occurs. This inopportune duplication is detected, and consequently the processing may be stopped, since a non-envisaged access to the interface INT3 is detected by a performance counter PM2.

In the case of FIG. 4b, a malfunction of the DMA direct memory access unit gives rise, instead of to an access to the private area Z1, to an access to the private area Z3 of another application package in the external memory MEM. This inopportune redirection is detected, and consequently the processing may be stopped, since there is no equality between the total number of transactions and the number of transactions in the target area Z1. Indeed, for example, the logic pseudo-analyser TB is configured to count the transactions in the private area Z1 of the application package in progress. It returns an inconsistent value in relation to that measured by the performance counter PM3, which has counted the total number of transactions.

The invention is not limited to the protection of a direct memory access unit, but may be applied to any other entity of a microcontroller, including the processor core. Indeed the invention makes it possible to cover an element outside the microcontroller which shares the main memory (MEM) of the microcontroller. In an optional embodiment, the implementation of the invention ensures, for the integrated processor (P1), an MMU memory management unit monitoring function, or indeed ensures the actual memory management unit function, in a manner equivalent to a unit of MMU type if the latter is not present.

The invention has a advantages that include, but are not limited to, a method and an associated device making it possible to detect erroneous or inopportune accesses carried out via a DMA direct memory access unit or via external master peripherals.

What is claimed is:

1. A method for detecting inopportune or erroneous transactions by way of a direct memory access unit or of an external master peripheral, for implementation on a microcontroller, said microcontroller exhibiting a direct memory access unit and at least one interface linked to the direct memory access and the microcontroller being able to implement transactions by way of the direct memory access unit or of the external master peripheral connected to the microcontroller, from and to a target area of a target interface of the microcontroller, said target interface being a private area of an application package on a memory external to the microcontroller, said microcontroller comprising at least one non-target interface, to which no transaction can be performed, said method comprising a step of verifying by way of logic pseudo-analysers the number of transactions on the said non-target interface, said number of transactions on the said non-target interface having to be zero.

2. The method according to claim 1, further comprising:
 the programming of a set of counters internal or external to the microcontroller, said counters being configured to:
  count the number of transactions in the target area of the target interface of the microcontroller;
  count the total number of transactions on the said target interface; and verify that the number of transactions outside of the target area of the target interface of the microcontroller is zero; and the verification of equality between the number of transactions in the target area of the target interface and the total number of transactions on the target interface of the microcontroller.

3. The method according to claim 1, wherein the target area corresponds to a range of addresses of the target interface.

4. The method according to claim 2, wherein the target area corresponds to a range of addresses of the target interface.

5. The method according to claim 1, further comprising:

the programming of one or more performance counters to count the total number of transactions to all the interfaces, including the target interface;

the programming of a logic pseudo-analyser to count the total number of transactions in the private area of the application package in progress;

the comparison of the total number computed by the logic pseudo-analyser with the total number computed by the performance counter of the target interface, to verify their equality; and the programming of a set of performance counters to verify that the number of transactions on the non-target interfaces is zero.

6. The method according to claim 1, wherein the microcontroller comprises at least one critical interface in which any write-transaction is prohibited, wherein the step aimed at verifying that the number of transactions outside of the target area of the target interface of the microcontroller is zero includes verifying that the number of write-transactions on the critical interface is zero.

7. A device for detecting inopportune or erroneous transactions by way of a direct memory access unit or of an external master peripheral for use in a microcontroller, said microcontroller comprising at least one microprocessor, a direct memory access unit, and one or more interfaces corresponding to one or more external memory units or to one or more input-output interfaces, said microcontroller able to implement transactions by way of the direct memory access unit, to a target area of a target interface of the microcontroller, said device comprising a plurality of counters internal or external to the microcontroller, the plurality of counters being programmed to supervise the transactions between the direct memory access unit and said target interface by verifying that a number of transactions counted in the target area is the same as a number of transactions counted on the target interface.

8. The device according to claim 7, wherein a function of a memory management unit of the microprocessor is integrated into the microcontroller.

9. The device according to claim 7, further comprising at least three counters, configured respectively to: count the number of transactions in the target area of the target interface of the microcontroller; count the total number of transactions on the said target interface; and verify that the number of transactions outside of the target area of the target interface of the microcontroller is zero.

10. The device according to claim 8, further comprising at least three counters, configured respectively to:

count the number of transactions in the target area of the target interface of the microcontroller;

count the total number of transactions on the said target interface; and verify that the number of transactions outside of the target area of the target interface of the microcontroller is zero.

11. The device according to claim 10, wherein the microcontroller comprises at least one microprocessor having a data and monitoring bus by way of which all the transactions within the microcontroller travel, and wherein a proportion at least of the counters is connected to said data and monitoring bus.

12. The device according to claim 8, wherein the microcontroller comprises a clock, and wherein a proportion at least of the counters is regulated by said clock of the microcontroller.

13. The device according to claim 8, wherein the microcontroller comprises a clock, an wherein a proportion at least of the counters are performance counters metering the number of transactions culminating in success.

14. The device according to claim 8, wherein the microcontroller comprises deactivated interfaces, and wherein the device further comprises a counter configured to verify that the number of transactions on the said deactivated interfaces is zero.

15. The device according to claim 8, further comprising a plurality of interfaces.

16. The device according to claim 14, further comprising a plurality of interfaces.

17. The device according to claim 16, wherein said interfaces are sub-sets of one and the same physical interface, such as various memory areas within one and the same random access memory unit.

18. A microcontroller for an embedded computer, comprising a device for detecting inopportune or erroneous transactions by way of a direct memory access unit or of an external master peripheral for use in a microcontroller according to claim 8.

19. The microcontroller according to claim 18, further comprising one or more single-core or multi-core processors.

20. An embedded computer comprising a microcontroller according to claim 18.

* * * * *